United States Patent
Lee et al.

(10) Patent No.: US 10,483,813 B2
(45) Date of Patent: Nov. 19, 2019

(54) ROTOR HAVING FLUX FILTERING FUNCTION AND SYNCHRONOUS MOTOR COMPRISING SAME

(71) Applicant: KOREA ELECTRONICS TECHNOLOGY INSTITUTE, Seongnam-si, Gyeonggi-do (KR)

(72) Inventors: Jeongjong Lee, Incheon (KR); Youngkyoun Kim, Seoul (KR); Sehyun Rhyu, Bucheon-si (KR); Jungmoo Seo, Goyang-si (KR); Insoung Jung, Seoul (KR)

(73) Assignee: KOREA ELECTRONICS TECHNOLOGY INSTITUTE, Seongnam-si, Gyeonggi-do (KR)

( * ) Notice: Subject to any disclaimer, the term of this patent is extended or adjusted under 35 U.S.C. 154(b) by 141 days.

(21) Appl. No.: 15/309,767

(22) PCT Filed: Sep. 24, 2014

(86) PCT No.: PCT/KR2014/008865
§ 371 (c)(1),
(2) Date: Nov. 8, 2016

(87) PCT Pub. No.: WO2015/170805
PCT Pub. Date: Nov. 12, 2015

(65) Prior Publication Data
US 2017/0271930 A1    Sep. 21, 2017

(30) Foreign Application Priority Data

May 8, 2014  (KR) .................. 10-2014-0054981

(51) Int. Cl.
*H02K 3/20* (2006.01)
*H02K 1/22* (2006.01)
(Continued)

(52) U.S. Cl.
CPC .............. *H02K 1/223* (2013.01); *H02K 1/276* (2013.01); *H02K 3/20* (2013.01); *H02K 17/26* (2013.01); *H02K 21/46* (2013.01)

(58) Field of Classification Search
CPC .... H02K 17/165; H02K 1/276; H02K 1/2706; H02K 1/2766
(Continued)

(56) References Cited

U.S. PATENT DOCUMENTS

2005/0040723 A1* 2/2005 Asai ................ H02K 21/14
                                                        310/156.53
2006/0087190 A1   4/2006 Han et al.
(Continued)

FOREIGN PATENT DOCUMENTS

JP    2006-121896 A    5/2006
KR    10-2007-0092805    9/2007
(Continued)

OTHER PUBLICATIONS

International Search Report dated Jan. 28, 2015 in International Application No. PCT/KR2014/008865, filed Sep. 24, 2014.
(Continued)

*Primary Examiner* — Terrance L Kenerly
(74) *Attorney, Agent, or Firm* — Knobbe Martens

(57) ABSTRACT

The described technology relates to a rotor having a flux filtering function and a synchronous motor comprising the same. The rotor includes a rotor iron core, a plurality of permanent magnets and a plurality of conductor bars. The rotor iron core has a rotary shaft insertion hole, formed in the center thereof, into which a rotary shaft is inserted, a plurality of permanent magnet insertion holes being formed in the circumference of the rotary shaft insertion hole, and a plurality of conductor bar insertion holes are uniformly formed in a region between the plurality of permanent (Continued)

magnet insertion holes and the outer surfaces thereof. The plurality of permanent magnets are respectively inserted into the plurality of permanent magnet insertion holes, thereby forming N and S magnetic poles of the rotor. Additionally, the plurality of conductor bars are respectively inserted into the plurality of conductor bar insertion holes.

4 Claims, 2 Drawing Sheets

(51) Int. Cl.
  *H02K 1/27* (2006.01)
  *H02K 21/46* (2006.01)
  *H02K 17/26* (2006.01)
(58) Field of Classification Search
  USPC .................. 310/156.53, 156.56, 156.77
  See application file for complete search history.

(56) References Cited

U.S. PATENT DOCUMENTS

2007/0138894 A1\* 6/2007 Shin ................. H02K 1/223
  310/156.83
2010/0148614 A1 6/2010 Park et al.

FOREIGN PATENT DOCUMENTS

| KR | 2007-0100995 A | 10/2007 |
| KR | 10-2009-0007050 A | 1/2009 |
| KR | 10-2010-0069792 A | 6/2010 |
| KR | 10-1123676 B1 | 3/2012 |
| KR | 10-2012-0129162 A | 11/2012 |

OTHER PUBLICATIONS

Decision to Grant dated Jun. 23, 2016 in Korean Application No. 10-2014-0054981, filed May 8, 2015.

\* cited by examiner

[FIG. 1]
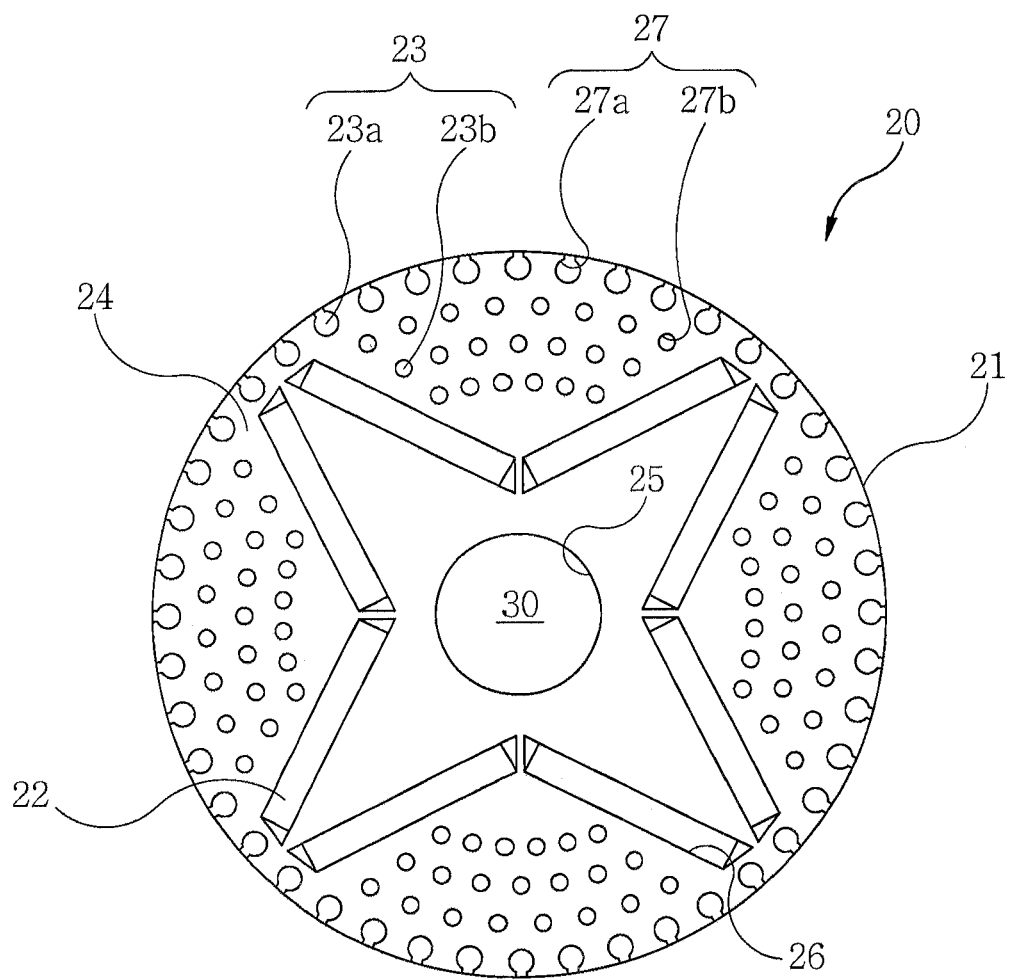

[FIG. 2]
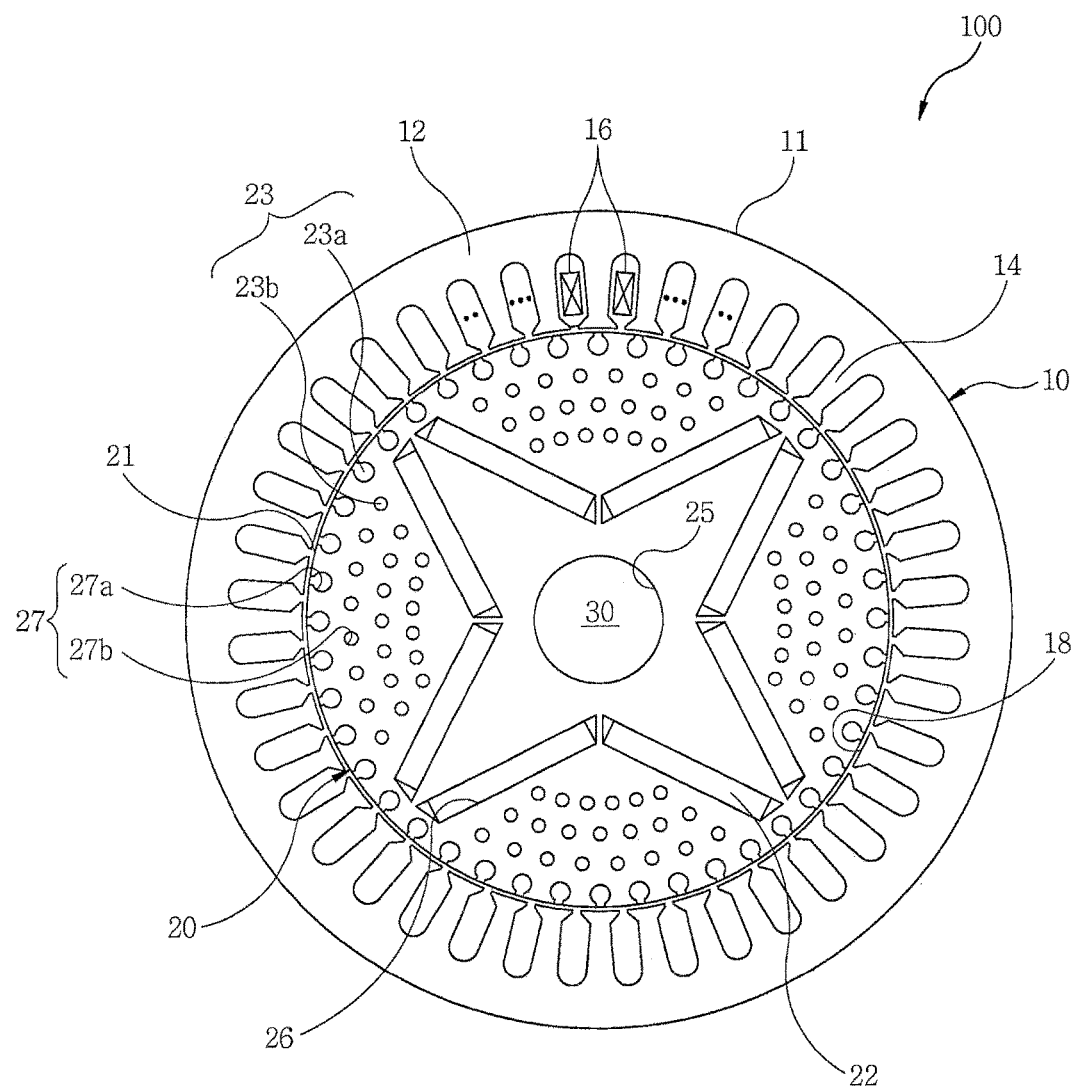

ROTOR HAVING FLUX FILTERING FUNCTION AND SYNCHRONOUS MOTOR COMPRISING SAME

BACKGROUND

Field

The described technology relates to a synchronous motor, and more particularly, to a rotor having a flux filtering function which allows is demagnetization of a permanent magnet installed in the rotor to be suppressed to suppress an efficiency decrease of a motor, and a synchronous motor having the same.

Description of the Related Technology

Generally, motors (or electric motors) are apparatuses which generate a rotational force by converting electric energy into mechanical energy and are widely used for domestic and industrial applications. Such motors are largely classified into alternating current (AC) motors and direct current (DC) motors.

A DC motor, which is a motor driven by DC power and configured to obtain a required output power by changing an input voltage, is used to drive streetcars, elevators, or the like because adjusting a speed thereof is relatively easy. DC motors may be classified into brush DC motors and brushless DC motors. Brushless DC motors do not have a contact portion, such as a brush and a commutator, unlike a brush DC motor, and accordingly a high performance, light, miniaturized, and long lived motor may be realized. In addition, a brushless DC motor has a structure in which coils are wound around a rotor and permanent magnets are embedded in the rotor. Such a brushless DC motor is widely used for various devices based on the development of semiconductor technologies, components, and materials.

An AC motor is driven by an AC power and is the most widely used kind of motor in everyday life. An AC motor basically includes an outer stator and an inner rotor and is a motor in which, when an AC current is supplied to wound coils of the stator, an electromagnetic field is changed by electromagnetic induction, an induction current is generated by a rotating electric field in the rotor, and a rotational force is generated by torque at a rotating shaft positioned in the rotor.

Such AC motors are mainly classified into single-phase motors and three-phase motors and are also classified into induction motors, synchronous motors, and commutator motors based on types of rotors.

A synchronous motor, such as a line start permanent magnet (LSPM) motor (also referred to as a single-phase induction motor), is a kind of motor to which only merits of a single induction motor and a synchronous motor are applied.

Such a synchronous motor is a motor which is started by starting rotation of a rotor due to torque generated by interaction of a secondary current generated by a voltage induced in conductive bars of the rotor and a magnetic flux generated by wound wires of the rotor, and when normally operating, is driven at a speed of a rotation magnetic field of the rotor by synchronizing magnetic fields of permanent magnets installed in the rotor with magnetic fields generated at the stator. That is, when a current is applied to coils of the stator, the rotator rotates due to interaction between a rotating magnetic flux generated due to a structure of the stator and an induction current generated in the conductive bars of the rotor. In addition, when a speed of the rotator reaches a synchronous speed, torque due to the permanent magnets and reluctance torque due to a structure of the rotor are generated and the rotor rotates.

A rotor of such an LSPM motor has a structure including a cylindrical iron core, a plurality of conductive bars inserted into a circumferential edge of the iron core of the rotor, and a plurality of permanent magnets inserted and installed in the conductive bars.

High performance operation is possible by applying a permanent magnet having high performance to an LSPM motor having such a structure, but there is a problem in that demagnetization of the permanent magnet occurs due to an initial operating current applied when initially operating the LSPM motor. That is, the demagnetization of the permanent magnet occurs due to an asynchronous magnetic flux (an AC component) generated at the coils when the LSPM motor initially is operated.

In addition, demagnetization of the permanent magnet also occurs when step out occurs.

There is a problem in that an efficiency of a motor decreases as a demagnetization of a permanent magnet occurs.

SUMMARY OF CERTAIN INVENTIVE ASPECTS

The described technology is directed to providing a rotor having a flux filtering function capable of suppressing demagnetization of a permanent magnet instilled in a rotor to suppress an efficiency decrease of a motor, and a synchronous motor including the same.

The described technology is also directed to providing a rotor having a flux filtering function capable of suppressing an influence of an asynchronous magnetic flux component, which is not synchronized with a rotor, on a permanent magnet, and a synchronous motor including the same.

One aspect of the present invention provides a rotor of a synchronous motor which is inserted and rotatably installed in a rotor insertion hole of a stator, which includes a rotor iron core, a plurality of permanent magnets, and a plurality of conductive bars. In the rotor iron core, a rotating shaft insertion hole in which a rotating shaft is inserted and installed is formed at a central portion of the rotor iron core, a plurality of permanent magnet insertion holes are formed on a perimeter of the rotating shaft insertion hole, and a plurality of conductive bar insertion holes are uniformly formed in a region between the plurality of permanent magnet insertion holes and an outer side surface of the rotor iron core. The plurality of permanent magnets are respectively inserted into the plurality of permanent magnet insertion holes to form N and S magnet poles of the rotor. In addition, the plurality of conductive bars are respectively inserted and installed in the plurality of conductive bar insertion holes.

The plurality of conductive bar insertion holes may include a plurality of first conductive bar insertion holes formed on a circumferential edge of the rotor iron cores, and a plurality of second conductive bar insertion holes uniformly formed in a region between the plurality of permanent magnet insertion holes and the plurality of first conductive bar insertion holes. Here, the plurality of conductive bars may include a plurality of first conductive bars respectively inserted and installed in the plurality of first conductive bar insertion holes, and a plurality of second conductive bars respectively inserted and installed in the plurality of second conductive bar insertion holes.

The plurality of second conductive bar insertion holes may be arranged on respective circumferences having different radiuses around the rotating shaft insertion hole.

A plurality of second conductive bar insertion holes arranged on a circumference adjacent to the plurality of first conductive bar insertion holes may be formed to be respectively positioned between the adjacent first conductive bar insertion holes.

The second conductive bar insertion holes positioned on adjacent circumferences may be formed to be diagonally positioned at different angles around the rotating shaft insertion hole.

Another aspect of the present invention provides a rotor of a synchronous motor which is inserted and rotatably installed in a rotor insertion hole of a stator, which includes a rotor iron core, a plurality of permanent magnets, and a plurality of conductive bars. In the rotor iron core, a rotating shaft insertion hole in which a rotating shaft is inserted and installed is formed at a central portion thereof, a plurality of permanent magnet insertion holes are formed on a perimeter of the rotating shaft insertion hole, and a plurality of conductive bar insertion holes are uniformly formed in a region between the plurality of permanent magnet insertion holes and an outer side surface of the rotor iron core on circumferences having different radiuses around the rotating shaft insertion hole. A plurality of permanent magnets respectively inserted into the plurality of permanent magnet insertion holes to form N and S magnetic poles of the rotor. In addition, a plurality of conductive bars respectively inserted and installed in the plurality of conductive bar insertion holes.

The plurality of conductive bar insertion holes may include a plurality of first conductive bar insertion holes which are adjacent to the outer side surface of the rotor iron core and are uniformly formed on a first circumference having a largest radius, and a plurality of second conductive bar insertion holes uniformly formed on at least one second circumference having a radius smaller than that of the first circumference. Here, the plurality of conductive bars may include a plurality of first conductive bars respectively inserted and installed in the plurality of first conductive bar insertion holes, and a plurality of second conductive bars respectively inserted and installed in the plurality of second conductive bar insertion holes.

In addition, still another aspect of the present invention provides a synchronous motor including the above-described rotor, a stator in which a rotor insertion hole in which the rotor is inserted and installed is formed at a central portion of the stator, and a coil is wound around an inner circumferential surface of the rotor insertion hole.

According to the described technology, since a plurality of conductive bars, which are installed in a plurality of layers between permanent magnets and coils of a rotor, pass a direct current (DC) magnetic flux component generated at the, permanent magnets and filter an asynchronous magnetic flux component which is generated at the coils and is not synchronized with the rotor, a demagnetization Particularly, since a plurality of conductive bars filter an asynchronous magnetic flux component generated when a synchronous motor initially operates or step out occurs, a demagnetization phenomenon of a permanent magnet can be suppressed.

In addition, since a demagnetization phenomenon of a permanent magnet is suppressed, an efficiency decrease of a synchronous motor can be suppressed.

BRIEF DESCRIPTION OF THE DRAWINGS

FIG. 1 is a plan view illustrating a rotor of a synchronous motor having a flux filtering function according to an embodiment of the present invention.

FIG. 2 is a plan view illustrating the synchronous motor including the rotor shown in FIG. 1.

DETAILED DESCRIPTION OF CERTAIN INVENTIVE EMBODIMENTS

The following descriptions will be made focusing on configurations necessary to understand embodiments of the invention. Therefore, descriptions of other configurations that might obscure the gist of the described technology will be omitted.

Terms and words used in this specification and claims are not to be interpreted as limited to commonly used meanings or meanings in dictionaries and should be interpreted as having meanings and concepts which are consistent with the technological scope of the described technology based on the principle that the inventor has appropriately defined concepts of terms in order to describe the described technology in the best way. Therefore, since the embodiments described in this specification and configurations illustrated in the drawings are only exemplary embodiments and do not represent the overall technological scope of the described technology, it should be understood that the described technology covers various equivalents, modifications, and substitutions at the time of filing of this application.

Hereinafter, an embodiment of the present invention will be described in detail with reference to the accompanying drawings.

FIG. 1 is a plan view illustrating a rotor of a synchronous motor having a flux filtering function according to an embodiment of the present invention, and FIG. 2 is a plan view illustrating the synchronous motor including the rotor shown in FIG. 1.

Referring to FIGS. 1 and 2, a synchronous motor 100 according to the embodiment of the present invention includes a rotor 20 and a stator 10 into which the rotor 20 is rotatably inserted. A rotor insertion hole 18 is formed at a central portion of the stator 10, and coils 16 are wound around an inner circumferential surface of the rotor insertion hole 18. In addition, the rotor 20 is inserted and rotatably installed in the rotor insertion hole 18 of the stator 10. The stator 10 includes a stator iron core 11 in which the rotor insertion hole 18 is formed, and the coils 16 wound along the inner circumferential surface of the rotor insertion hole 18 of the stator iron core 11. Here, an inner diameter of the rotor insertion hole 18 is greater than an outer diameter of the rotor 20, and a difference between the inner diameter of the rotor insertion hole 18 and the outer diameter of the rotor 20 forms an air gap.

The stator iron core 11 may be formed by stacking a plurality of identically shaped stator iron plates 12 in an axial direction thereof. The rotor insertion hole 18, in which the rotor 20 is inserted and positioned, is formed inside the stator iron core 11. A plurality of teeth 14 are formed to each have a predetermined gap along an inner circumferential surface of the stator iron core 11. The plurality of teeth 14 protrude from the inner circumferential surface of the stator iron core 11 toward a central axis of the stator iron core 11 and are disposed adjacent to an outer circumferential surface of the rotor 20 inserted and installed in the rotor insertion hole 18. Here, a silicon iron plate may be used as the stator iron plate 12. An inside of a virtual surface formed by ends of the teeth 14 inside the stator iron core 11 forms the rotor insertion hole 18.

In addition, since the coils 16 are respectively wound around the plurality of teeth 14, a rotating magnetic flux is generated due to a structure of the stator 10 when AC power is applied thereto.

Meanwhile, although not illustrated in the drawings, a rotating shaft 30 is installed in a casing or shell, which forms a case of the synchronous motor 100, to be rotatable using a bearing as a medium.

The rotor 20 is a rotor of the synchronous motor 100 which is inserted and rotatably installed in the rotor insertion hole 18 of the stator 10 and includes a rotor iron core 21, a plurality of permanent magnets 22 embedded in the rotor iron core 21, and a plurality of conductive bars 23. In the rotor iron core 21, a rotating shaft insertion hole 25, in which the rotating axle 30 is inserted and installed, is formed at a central portion thereof, a plurality of permanent magnet insertion holes 26 are formed on a circumference of the rotating shaft insertion hole 25, and a plurality of conductive bar insertion holes 27 are formed outside the plurality of permanent magnet insertion holes 26. The plurality of permanent magnets 22 are respectively inserted into the plurality of permanent magnet insertion holes 26 and form N and S poles. In addition, the plurality of conductive bars 23 are respectively inserted and installed in the plurality of conductive bar insertion holes 27. Here, the plurality of conductive bars 23 are uniformly inserted and installed in an inner portion of the rotor iron core 21 in addition to a circumferential edge of the rotor iron core 21.

The reason why the conductive bars 23 are formed as described above is to suppress a demagnetization phenomenon of the permanent magnet 22 by filtering an asynchronous magnetic flux component generated at the coils 16 when the synchronous motor 100 initially operates or step out occurs. According to the present embodiment, the rotor 20 having a function of filtering a flux corresponding to an asynchronous magnetic flux component is provided.

That is, since the plurality of conductive bars 23, which are installed in a plurality of layers between the permanent magnets 22 of the rotor 20 and the coils 16 of the stator 10, pass a direct current (DC) magnetic flux component generated by the permanent magnets 22 and filter an asynchronous magnetic flux component which is generated at the coils 16 and is not synchronized with the rotor 20, the demagnetization phenomenon of the permanent magnet 22 due to the asynchronous magnetic flux component can be suppressed. Particularly, since the plurality of conductive bars 23 filter the asynchronous magnetic flux component generated at the coils 16 when the synchronous motor 100 initially operates or step out occurs, the demagnetization phenomenon of the permanent magnet 22 can be suppressed.

In addition, since the demagnetization phenomenon of the permanent magnet 22 is suppressed, an efficiency decrease of the synchronous motor 100 can be suppressed.

The rotor 20 according to the present embodiment will be described in detail below.

As described above, the rotor 20 includes the rotor iron core 21, the plurality of permanent magnets 22, and the plurality of conductive bars 23.

The rotor iron core 21 is formed by stacking a plurality of rotor iron plates 24 in an axial direction thereof. The rotating shaft insertion hole 25 into which the rotating shaft 30 is inserted is formed at the central portion of the rotor iron core 21. The plurality of permanent magnet insertion holes 26 are formed around the rotating shaft insertion hole 25 in the rotor iron core 21. In addition, the plurality of conductive bar insertion holes 27 are formed outside the plurality of permanent magnet insertion holes 26 in the rotor iron core 21.

Here, a silicon iron plate may be used as the rotor iron plates 24. The rotating shaft insertion hole 25 and the permanent magnet insertion holes 26 may be formed in a direction perpendicular to a top surface of the rotor iron core 21.

In the present embodiment, an example in which eight permanent magnet insertion holes 26 in which the permanent magnets 22 with a rectangular cross section with respect to an axial direction of the rotating shaft insertion hole 25 are installed are formed in the rotor iron core 21 around the rotating shaft insertion 25 is disclosed, but the present embodiment is not limited thereto. Here, the eight permanent magnet insertion holes 26 may be formed at four positions around the rotating shaft insertion hole 25 in pairs in a V shape. An angle between the pair of the permanent magnet insertion holes 26 disposed in the V shape may be an obtuse angle, and an angle between pairs of the permanent magnet insertion holes 26 in adjacent V shapes may be an acute angle.

The plurality of permanent magnets 22 are respectively inserted into the plurality of permanent magnet insertion holes 26 of the rotor iron core 21 to form N and S magnetic poles of the rotor. Here, the plurality of permanent magnets 22 generate torque by interacting with a magnetic flux generated at the coils 16. A rare earth magnet may be used as the permanent magnet 22.

The plurality of conductive bar insertion holes 27 are uniformly formed in a region between the plurality of permanent magnet insertion holes 26 and an outer surface of the rotor iron core 21.

In addition, the plurality of conductive bars 23 are respectively inserted and installed in the plurality of conductive bar insertion holes 27. The plurality of conductive bars 23 may be installed in the conductive bar insertion holes 27 using a die casting method. The conductive bars 23 may be generally formed of aluminum (Al) which has excellent electrical conductivity and a die casting can be performed. The conductive bars 23 formed by die casting may be formed in a shape corresponding to a shape of the conductive bar insertion holes 27.

Here, the plurality of conductive bar insertion holes 27 may be formed in a direction in which the permanent magnet insertion holes 26 are formed, that is, a shape which passes through the rotor iron core 21. The plurality of conductive bar insertion holes 27 have a circular or elliptical shape and are disposed in the rotor iron core 21. The conductive bar insertion holes 27 may be formed in a shape of a circle or slot toward the permanent magnet 22.

The plurality of conductive bar insertion holes 27 include a plurality of first conductive bar insertion holes 27a and a plurality of second conductive bar insertion holes 27b. The plurality of first conductive bar insertion holes 27a are formed on the circumferential edge of the rotor iron core 21. The plurality of second conductive bar insertion holes 27b are uniformly formed in a region between the plurality of permanent magnet insertion holes 26 and the plurality of first conductive bar insertion holes 27a.

The plurality of conductive bars 23 include a plurality of first conductive bars 23a and a plurality of second conductive bars 23b. The plurality of first conductive bars 23a are respectively inserted and installed in the plurality of first conductive bar insertion holes 27a. The plurality of second conductive bars 23b are respectively inserted and installed in the plurality of second conductive bar insertion holes 27b.

The plurality of first conductive bar insertion holes 27a may be formed to have uniform gaps, or may also be formed to have different gaps.

The plurality of second conductive bar insertion holes 27b may be arranged on respective circumferences having different radiuses around the rotating shaft insertion hole 25. The plurality of second conductive bar insertion holes 27b arranged on a circumference adjacent to the plurality of first conductive bar insertion holes 27a are formed to be positioned between the adjacent first conductive bar insertion holes 27a. In addition, the second conductive bar insertion holes 27b positioned on adjacent circumferences are formed to be diagonally positioned at different angles around the rotating shaft insertion hole 25. The second conductive bars 23 are respectively formed in the plurality of second conductive bar insertion holes 27b.

For example, when the permanent magnets 22 are installed in the rotor iron core 21 in the V shape, the plurality of conductive bars 23 are formed at a region between the permanent magnets 22 in the V shape and the outer surface of the rotor iron core 21. The permanent magnets 22 disposed in the V shape are installed such that valley regions thereof face the rotating shaft 30, and the second conductive bars 23b are formed inside a portion of a corresponding valley region.

The reason why the plurality of second conductive bar insertion holes 27b are formed in the rotor iron core 21 is to filter an asynchronous magnetic flux component which demagnetizes the permanent magnet 22. That is, although the asynchronous magnetic flux component is primarily filtered by the plurality of first conductive bars 23a, some of the asynchronous magnetic flux component is introduced to a side at which the permanent magnets 22 are positioned through positions between the plurality of first conductive bars 23a. Such an asynchronous magnetic flux component is filtered by the plurality of second conductive bars 23b positioned between the first conductive bar insertion holes 27a. Since the plurality of second conductive bars 23b are diagonally formed in a zigzag shape, an influence of the asynchronous magnetic flux component on the permanent magnets 22 may be minimized.

In the above-described present embodiment, an example in which the plurality of conductive bar insertion holes 27 are uniformly formed in the region between the plurality of permanent magnet insertion holes 26 and the outer surface of the rotor iron core 21 on circumferences having different radiuses around the rotating shaft insertion hole 25 is disclosed. That is, the plurality of first conductive bar insertion holes 27a are adjacent to the outer surface of the rotor iron core 21 and are uniformly formed on a first circumference having the largest radius. In addition, the plurality of second conductive bar insertion holes 27b are uniformly formed on at least one second circumference having a radius smaller than that of the first circumference. When a virtual straight line (hereinafter, referred to as a virtual line) is drawn from the center of the rotating shaft insertion hole 25 through a specific conductive bar insertion hole 27, a conductive bar insertion hole 27 positioned on a circumference adjacent to the specific conductive bar insertion hole 27 is disposed not to be positioned on the corresponding virtual line.

In the present embodiment, an example in which the plurality of conductive bar insertion holes 27 are uniformly formed in the region between the plurality of permanent magnet insertion holes 26 and the outer surface on circumferences having different radiuses around the rotating shaft insertion hole 25 is disclosed, but the present invention is not limited thereto. The plurality of second conductive bar insertion holes 27 may be randomly formed between the plurality of permanent magnet insertion holes 26 and the plurality of first conductive bar insertion holes 27a.

As described above, since the synchronous motor 100 according to the present embodiment includes the plurality of first conductive bars 23a and the plurality of second conductive bars 23b, a rotation magnetic field generated at the stator iron core 11 during synchronous rotation moves at the same speed as a rotational speed of the rotor 20, and thus a DC magnetic flux component generated at the permanent magnets 22 passes through the conductive bars 23 without being filtered thereby. However, an asynchronous magnetic flux component, which is generated when the synchronous motor 100 initially operates or step out thereof occurs, is filtered by the plurality of conductive bars 23.

The embodiments disclosed in this specification and drawings are only examples to help understanding of the invention, and the invention is not limited thereto. It should be clear to those skilled in the art that various modifications based on the technological scope of the invention in addition to the embodiments disclosed herein can be made.

The invention claimed is:

1. A rotor of a synchronous motor configured to be inserted and rotatably installed in a rotor insertion hole of a stator, the rotor comprising:
   a rotor iron core disk comprising a central portion and a peripheral portion surrounding the central portion;
   a rotating shaft insertion hole formed through the central portion of the rotor iron core disk and configured to receive a rotation shaft;
   a plurality of magnet insertion slots formed through the peripheral portion of the rotor iron core disk, wherein each of the plurality of magnet insertion slots extends from a central end to a peripheral end away from the rotating shaft insertion hole when viewed along a rotational axis of the rotation shaft;
   a plurality of conductive bar insertion holes formed through the peripheral portion of the rotor iron core disk and located outside the plurality of magnet insertion slots in a radial direction of the rotor iron core disk;
   a plurality of permanent magnets, each of the plurality of permanent magnets inserted into a corresponding one of the plurality of magnet insertion slots; and
   a plurality of conductive bars, each of the plurality of conductive bars inserted and installed in a corresponding one of the plurality of conductive bar insertion holes,
   wherein the plurality of magnet insertion slots comprise a first magnet insertion slot and a second magnet insertion slot neighboring the first magnet insertion slot,
   wherein when viewed along the rotational axis of the rotation shaft, the first and second magnet insertion slots are angled less than 180 degrees when measured at the central ends thereof facing a circumferential edge of the rotor iron core disk such that a fan-shape portion of the rotor iron core disk is interposed between the first and second magnet insertion slots in a circumferential direction of the rotor iron core disk, and
   wherein the plurality of conductive bar insertion holes comprise a first set of conductive bar insertion holes formed through the fan-shape portion of the rotor iron core disk such that, when viewed along the rotational axis of the rotation shaft, the first set of conductive bar insertion holes are located closer to the rotating shaft insertion hole than the peripheral end of the first magnet insertion slot in the radial direction of the rotor iron core disk.

2. The rotor of claim 1, wherein the plurality of conductive bar insertion holes further comprise:
 a second set of conductive bar insertion holes formed on a circumferential edge of the rotor iron core disk.

3. The rotor of claim 1, wherein the first set of conductive bar insertion holes comprise a first row of conductive bar insertion holes and a second row of conductive bar insertion holes, and wherein the second row of conductive bar insertion holes are disposed farther from the rotating shaft insertion hole than the first row of conductive bar insertion holes in the radial direction of the rotor iron core disk.

4. A synchronous motor comprising:
 the rotor of claim 1; and
 a stator including i) the rotor insertion hole, formed at a central portion thereof, in which the rotor is inserted and installed and ii) a coil wound around an inner circumferential surface of the rotor insertion hole.

\* \* \* \* \*